(12) United States Patent
Bonin

(10) Patent No.: US 8,191,407 B2
(45) Date of Patent: Jun. 5, 2012

(54) FOLDED BEAM SUSPENSION FOR PROBE

(75) Inventor: Wayne Allen Bonin, North Oaks, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 569 days.

(21) Appl. No.: 12/119,717

(22) Filed: May 13, 2008

(65) Prior Publication Data

US 2009/0282933 A1 Nov. 19, 2009

(51) Int. Cl.
*G01B 5/28* (2006.01)
(52) U.S. Cl. .......................................................... 73/105
(58) Field of Classification Search .................. None
See application file for complete search history.

(56) References Cited

U.S. PATENT DOCUMENTS

| | | | | |
|---|---|---|---|---|
| 3,557,461 | A * | 1/1971 | David et al. | 33/502 |
| 5,416,429 | A | 5/1995 | McQuade | |
| 6,678,966 | B1 * | 1/2004 | Koga et al. | 33/558 |
| 6,789,327 | B2 * | 9/2004 | Roth et al. | 33/556 |
| 7,167,434 | B2 | 1/2007 | Champion | |
| 7,265,937 | B1 | 9/2007 | Erden | |
| 7,310,298 | B2 | 12/2007 | Hilton | |
| 7,340,944 | B2 * | 3/2008 | Beyder et al. | 73/105 |
| 2005/0128927 | A1 | 6/2005 | Milligan | |
| 2006/0023606 | A1 | 2/2006 | Lutwyche | |
| 2006/0187803 | A1 | 8/2006 | Baechtold | |
| 2007/0121477 | A1 | 5/2007 | Belov | |
| 2008/0089211 | A1 | 4/2008 | Chu | |
| 2009/0043534 | A1 * | 2/2009 | Prestidge et al. | 702/152 |
| 2009/0115429 | A1 * | 5/2009 | Lee | 324/662 |

* cited by examiner

*Primary Examiner* — Robert R Raevis

(74) *Attorney, Agent, or Firm* — Mueting Raasch & Gebhardt PA

(57) ABSTRACT

Probe structures that utilize a folded beam structure to support the probe tip. The folded beam or supported-beam structure provides a linear spring force over a large displacement range while resisting probe tip tilting and lateral motion of the probe tip. In one embodiment, the probe structure has a supported-beam structure comprising an inner beam structure surrounded by an outer support, the inner beam structure pivotally connected to the outer support. The inner beam structure has a central region and the outer support having outer corner regions. The outer corner regions provide an attachment region to a supporting mechanism for the probe structure. A probe tip is located at the central region of the inner beam structure. The probe structure may have at least three arms, for example, four arms.

19 Claims, 3 Drawing Sheets

FOLDED BEAM SUSPENSION FOR PROBE

BACKGROUND

In computing systems, such as desktop computers, portable or laptop computers, servers, and others, storage devices are used to store data and program instructions. A disk-based storage device is one type of storage device; disk-based storage device include magnetic disk drives (e.g., a floppy disk drive or hard disk drive) and optical disk drives (e.g., a CD or DVD drive). Disk-based storage devices have a relatively large storage capacity. However, disk-based storage devices offer slower read-write speeds when compared to operating speeds of other components of a computing system, such as microprocessors and other semiconductor devices. A solid state memory device is another type of storage device; solid state memory devices include dynamic random access memory (DRAM), static random access memory (SRAM), flash memory, and electrically erasable and programmable read-only memory (EEPROM). Although solid state memory devices offer relatively high read-write speeds, usually on the order of nanoseconds, they have relatively limited storage capacities.

With improvements in nanotechnology, other types of storage devices are being developed. One class of storage device utilizes one or more microscopic scanning probes to read and write to a storage medium. Storage of data in the storage medium is based on perturbations (dents) created by a tip of the probe in the surface of the storage medium. In one implementation, a dent represents a data bit "1," and the lack of a dent represents a data bit "0." Other types of perturbations in the storage medium surface that can be used to convey data include creating or altering the topographic features or composition of the storage medium, altering the crystalline phase of the medium, filling or emptying existing electronic states of the medium, creating or altering domain structures or polarization states in the medium, creating or altering chemical bonds in the medium, employing tunneling effects to move and/or remove atoms or charge to or from the medium, or storing/removing charge from a particular region.

When the probe tip encounters and enters a dent, the tip (usually about 400° C.) transfers heat to the storage medium, which causes the temperature of the probe tip to fall, which in turn causes the electrical resistance of the tip to decrease. This decrease in resistance, which is a relatively tiny amount, is measured by detection circuitry that determines the state of the data bit. Another technique for detecting the state of a data bit uses a piezoresistive element in the probe. When the probe tip encounters a dent, the cantilever of the probe deflects, which causes the resistance of the piezoresistive element to change. This change in resistance is measured by detection circuitry.

Cantilevered probes or cantilever beams are used to support the probe tip and provide the required Z-axis (vertical) flexibility to follow the topography of the media surface. When supported by a cantilever spring, the probe tip often tilts as it moves up and down in the vertical direction, so that proper contact is obtained at only a single height position of the probe. Any variation due to media surface imperfection in flatness, or in assembly tolerances, could prevent proper operation of the device. Various attempts at providing a better cantilever probe have been attempted.

The invention of the present disclosure provides an improved cantilever probe design that inhibits probe tip tilt and provides a more constant vertical flexibility.

BRIEF SUMMARY

The present disclosure is directed to probe structures that utilize a folded beam structure to support the probe tip. The folded beam or supported-beam structure provides a linear spring force over a large displacement range while resisting probe tip tilting and lateral motion of the probe tip.

In one exemplary embodiment, the probe structure has a supported-beam structure comprising an inner beam structure surrounded by an outer support, the inner beam structure pivotally connected to the outer support. The inner beam structure has a central region and the outer support having outer corner regions. The outer corner regions provide an attachment region to a supporting mechanism for the probe structure. A probe tip is located at the central region of the inner beam structure. The probe structure may have at least three arms, for example, four arms.

In another exemplary embodiment, the probe structure has a supported-beam structure comprising an inner beam structure surrounded by an outer support, the inner beam structure being hingedly connected to the outer support. The inner beam structure has a central region and the outer support has outer corner regions. A probe tip is located at the central region of the inner beam structure. The probe structure is attached to a supporting mechanism at a region of outer support closest to the probe tip. The probe structure may have at least three arms, for example, four arms.

In yet another exemplary embodiment, the probe structure has a probe tip and probe body, the probe body comprising a cross-beam structure having an inner cross-beam structure surrounded by an outer support. The inner cross-beam structure is hingedly fixed to the outer support at each end of the inner cross-beam structure. The probe tip is located at an intersection region of the inner cross-beam structure. The intersection region is movable relative to at least a portion of the outer structure by being deflectable between a first position and a second position, with the first position placing the probe tip in operational contact with a sample, and the second position spacing the probe tip away from the sample.

BRIEF DESCRIPTION OF THE DRAWING

The invention may be more completely understood in consideration of the following detailed description of various embodiments of the invention in connection with the accompanying drawing, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present invention. The following detailed description, therefore, is not to be taken in a limiting sense.

Figure 5:
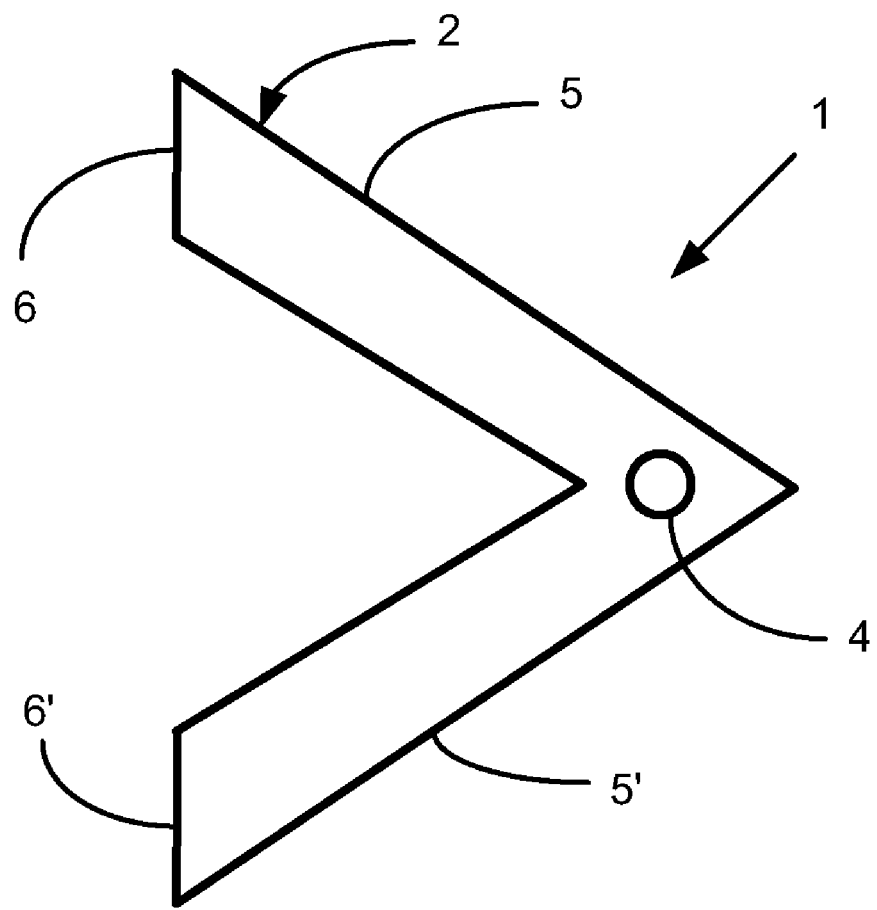
FIG. 5 is a schematic top view of a probe structure.
Figure 6:
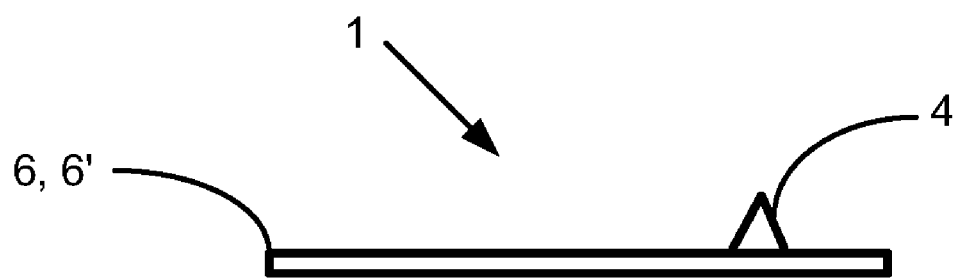
FIG. 6 is a side view of the probe structure of FIG. 5.

FIGS. 5 and 6 illustrate a probe structure 1 having a support structure 2 for a probe tip 4. Support structure 2 has extending arms 5 and 5'. Each extending arm 5, 5' has a distal end 6, 6', respectively. Probe structure 1 is fixedly attached or supported to a structure (e.g., a substrate) at distal ends 6, 6'.

The probe structures of this disclosure have a folded beam suspension structure to support the probe tip. The probe structure is movable from a first position to at least a second, displaced position. In the first position, the probe tip is in operational contact with a sample (e.g., within about 1 nm), such as an electronic storage medium, in the second position the probe tip is spaced away from the sample. For the probe tip to be in "operational contact" with the sample means that the probe tip is sufficiently near to determine data, for example, to physically detect a dent or lack of a dent, to measure the resistance of the sample, to measure the magnetization or polarization of the sample, etc. Depending on the sample and the mode by which the data is stored, the probe tip may be in physical contact, may be within 1 nm, may be within 10 nm, or the like.

The folded beam or supported-beam probe structures have a linear spring tension as the probe tip is deflected from the first position to the second position. Previous attempts have placed the probe tip at the center of a cross-beam structure fixed at both ends. Although such a structure inhibits the probe tip tilting with respect to Z-axis motion, it has the disadvantage of a non-linear spring constant. That is, as the probe tip is deflected away from the planar (neutral) position, tension is generated in the springs, which increases the spring stiffness. The folded beam or supported-beam structure of this invention provides a linear spring force over a large displacement range while resisting tilting and lateral motion of the probe tip.

While the present invention is not so limited, an appreciation of various aspects of the invention will be gained through the discussion provided below.

Figure 1:
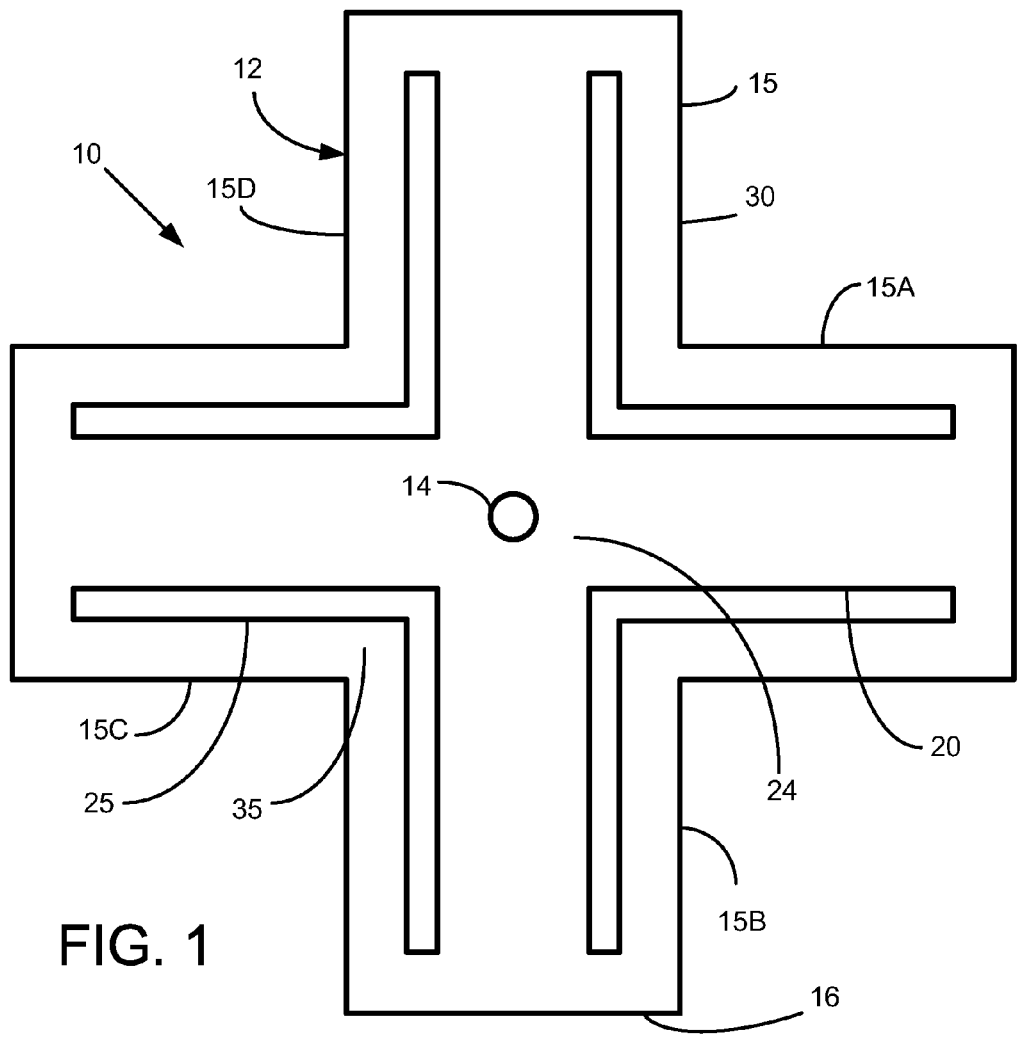
FIG. 1 is a schematic top view of a probe structure in accordance with this disclosure.
Figure 2:
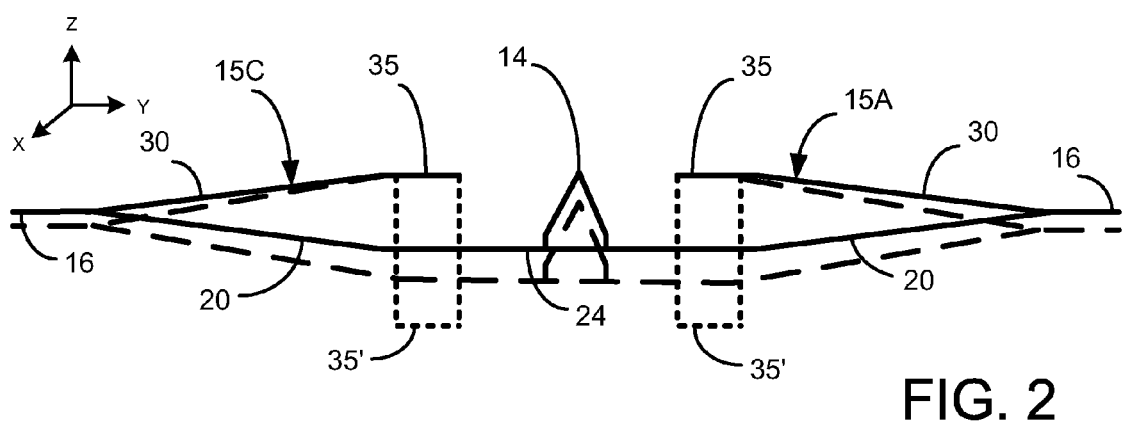
FIG. 2 is a side view of the probe structure of FIG. 1, showing the probe tip in a first position and in a second position.

Referring to FIG. 1 and to FIG. 2, a first embodiment of a probe structure according to the present disclosure is schematically illustrated as probe structure 10. Probe structure 10 has a support structure 12 with a centrally located probe tip 14. Probe tip 14 is configured to operably engage a sample material, e.g., an electronic storage medium, and detect information, such as, for example, indents in the sample, electrically conductive or magnetic bumps on the sample, a resistance or voltage distribution on the sample, or a magnetic charge on the sample. In some embodiments, probe tip 14 is configured to form indents or perturbations in the sample. Probe tip 14 is usually designed to be mechanically hard (to resist wear), to be chemically compatible with the sample (e.g., to avoid sample or probe tip degradation), and may have high electrical conductivity in either its bulk or in a specific portion, such as an embedded electrode. In some embodiments, probe structure 10 is very small (on the order of micrometers, nanometers, or even smaller) and is built using nanotechnology techniques (e.g., thin film or MEMS techniques).

Support structure 12 has a plurality of radially extending arms 15; in this embodiment, structure 12 has four arms 15A, 15B, 15C, 15D. Some embodiments of probe structures in accordance with this disclosure will have at least three radially extending arms. Each radially extending arm 15 has a distal end 16.

Support structure 12 includes an inner beam structure 20 surrounded by an outer support 30. Inner beam structure 20 is fixed to outer support 30 at each distal end 16 of each arm 15. The inner beam structures 20 of each arm 15 intersect at a central intersection region 24, which supports probe tip 14. For support structure 12, inner beam structure 20 and outer support 30 of each arm 15 extend parallel to each other. Support structure 12 may be referred to as a folded beam, because inner beam structure 20 of an arm 15 folds back to form its outer support 30.

Inner beam structure 20 and outer support 30 are connected together only at distal ends 16, so that the remainder of inner beam structure 20 and outer support 30 are not fixed or connected together. For support structure 12, a gap 25 extends between inner beam structure 20 and outer support 30. Gap 25 allows for relative vertical movement between inner beam structure 20 and outer support 30. In alternate embodiments, no gap may exist, but rather the inner beam structure and outer support are unconnected, allowing for relative vertical movement.

Support structure 12 is made of a material to allow each of inner beam structure 20 and outer support 30 to flex in the vertical direction (along the Z-axis), towards and away from a sample. In some embodiments, inner beam structure 20 and outer support 30 are made from a single continuous piece of material. See FIG. 1, where it can be seen that inner beam structure 20 and outer support 30 are continuous and contiguous (e.g., adjacent and connected).

Neighboring arms 15 (e.g., arm 15B and arm 15C) have their inner beam structure 20 meet at central intersection region 24 and have their outer support 30 meet at outer intersection corner region 35. Outer intersection region 35 is the portion of outer support 30 closest to probe tip 14.

In accordance with this invention, probe structure 10 is fixedly attached or supported to a structure (e.g., a substrate) at the region of outer support 30 proximate probe tip 14, e.g., at outer intersection region 35. Inner beam structure 20 and that portion of outer support 30 not fixedly attached are available for displacement from a first position to a second position.

In FIG. 2, two opposite arms 15A, 15C, in side view, are shown in both a first displaced position and a second displaced position (shown in phantom). In the first position, probe tip 14 virtually contacts a sample positioned above tip 14. Probe structure 10 is fixedly supported at outer intersection regions 35, for example, by supporting mechanisms 35' illustrated in phantom. Center intersection region 24, inner beam structure 20 and that portion of outer support 30 not fixedly attached are displaced from a planar position to a first displaced position and to a second displaced position. Distal end 16, where inner beam structure 20 folds back to outer support 30, remains parallel to supported outer intersection region 35. The deflection of inner beam structure 20 and outer support 30 from planar to the first position and to the second position will be a smooth transition, providing a linear spring force over a large Z-direction displacement distance.

Figure 3:
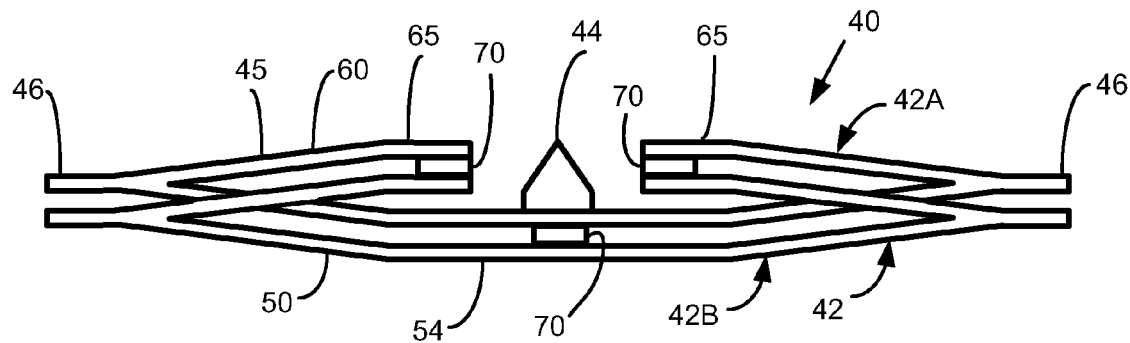
FIG. 3 is a schematic side view of a second embodiment of a probe structure in accordance with this disclosure.

FIG. 3 shows a schematic side view of a second embodiment of a supported-beam structure according to the present disclosure, particularly, a probe structure 40. The various elements of probe structure 40 have the same properties and qualities as the respective elements of probe structure 10, unless otherwise indicated.

Probe structure 40 is similar to probe structure 10 in that it has four arms 45 each having an inner beam structure 50 and an outer support 60 meeting at distal end 46. A probe tip 44 is supported on a center intersection region 54. Probe structure 40 is fixed to a structure (e.g., a substrate) at outer intersection corner regions 65. Probe structure 40, however, is a double structure, having two support bodies 42 (i.e., upper support body 42A and lower support body 42B) spaced apart and fixedly connected to each other by at least one spacer 70. In this embodiment, a spacer 70 is present at each intersection region 65 between support body 42A and support body 42B. A spacer 70 is also present proximate probe tip 44 between support body 42A and support body 42B. In most embodiments, support body 42A and support body 42B are parallel.

A multiple support body structure, such as probe structure 40, provides additional increased resistance to probe tip tilt resulting from side lead forces, over a single support body structure, such as probe structure 10.

Figure 4:
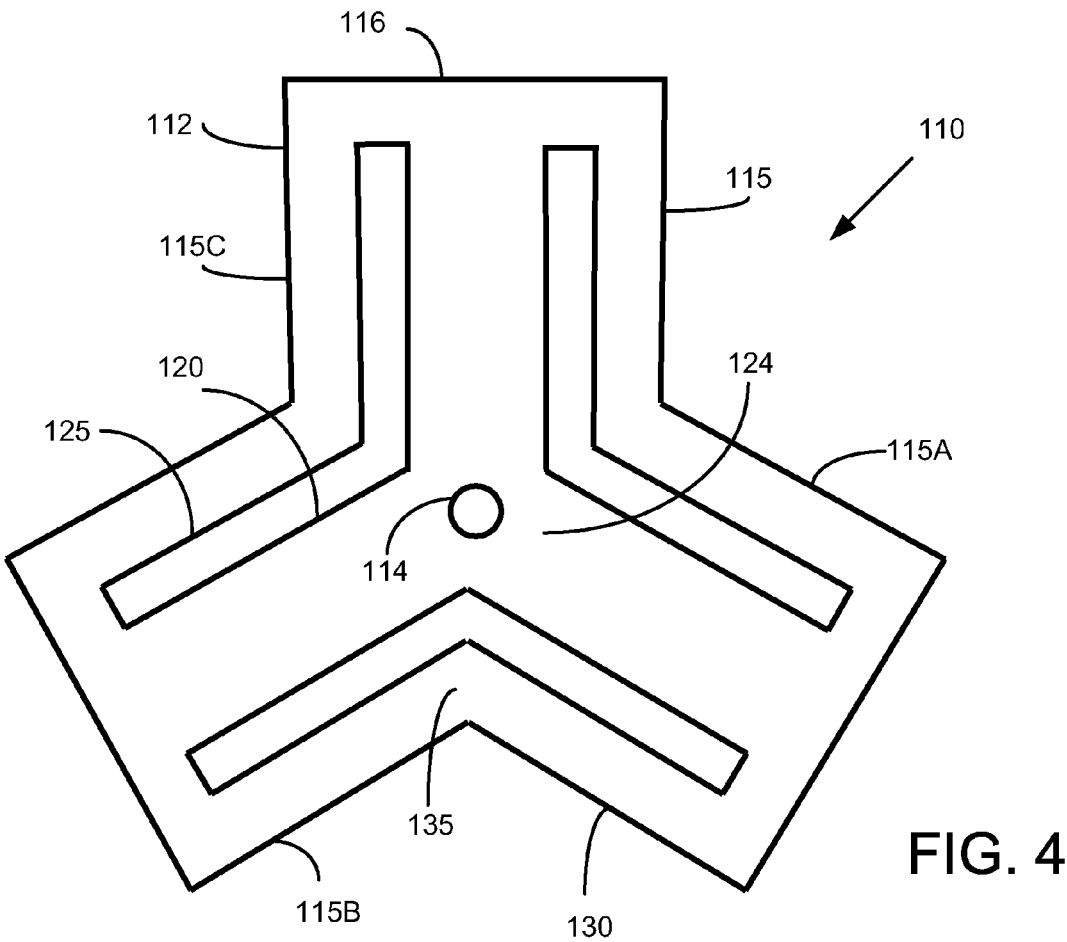
FIG. 4 is a schematic top view of a third embodiment of a probe structure in accordance with this disclosure.

Another embodiment of a supported-beam structure according to the present disclosure is illustrated in FIG. 4 as probe structure 110. The various elements of probe structure 110 have the same properties and qualities as the respective elements of probe structure 10 unless otherwise indicated.

Probe structure 110 has a support structure 112 with a centrally located probe tip 114. Support structure 112 has a plurality of radially extending arms 115; in this embodiment, structure 112 has three arms 115A, 115B, 115C. Each radially extending arm 115 has a distal end 116.

Support structure 112 includes an inner beam structure 120 surrounded by an outer support 130. Inner beam structure 120 is fixed to outer support 130 at each distal end 116 of each arm 115. The inner beam structures 120 of each arm 115 intersect at a central intersection region 124, which supports probe tip 114. For support structure 112, inner beam structure 120 and outer support 130 of each arm 115 extend parallel to each other. Support structure 112 may be referred to as a folded beam, because inner beam structure 120 of an arm 115 folds back to form its outer support 130.

Inner beam structure 120 and outer support 130 are connected together only at distal ends 116, so that the remainder of inner beam structure 120 and outer support 130 are not fixed or connected together. For support structure 112, a gap 125 extends between inner beam structure 120 and outer support 130. Gap 125 allows for relative vertical movement between inner beam structure 120 and outer support 130.

Support structure 112 is made of a material to allow each of inner beam structure 120 and outer support 130 to flex. In some embodiments, inner beam structure 120 and outer support 130 are made from a single continuous piece of material; inner beam structure 120 and outer support 130 are continuous and contiguous (e.g., adjacent and connected).

Neighboring arms 115 (e.g., arm 115A and arm 115B) have their inner beam structure 120 meet at central intersection region 124 and have their outer support 130 meet at outer intersection region 135. Outer intersection region 135 is the portion of outer support 130 closest to probe tip 114.

Probe structure 110 is fixedly attached or supported to a structure (e.g., a substrate) at the region of outer support 130 proximate probe tip 114, i.e., at outer intersection region 135. Inner beam structure 120 and that portion of outer support 130 not fixedly attached are available for displacement from the planar first position.

The supported-beam structures described above and other embodiments thereof provide a linear spring force over a large displacement range, due to the folded nature of the structure. Having the inner beam structure hingedly connected to the outer support provides a desirable spring stiffness. The supported-beam structures described above and other embodiments thereof also resist probe tip tilting and lateral motion of the probe tip that result from side load forces on the probe tip, for example, due to the at least three supported-beam arms. Of course, embodiments not described above would also have the benefits of those described embodiments. For example, alternate suitable embodiments may have five, six, eight, etc. arms. In some embodiments, the inner beam structure and outer support of each arm may not be parallel to each other.

Such supported-beam structures are suitable for various uses. For example, the structures are particularly suited for use with a probe or other detection device positioned in the central intersection region of the arms. Devices that include probes include electronic media devices (e.g., electronic storage devices, read-write devices, information processing devices) and microscopes. Scanning probe microscopes (SPMs) typically characterize the surface of a sample down to atomic dimensions by monitoring the interaction between the sample and a probe tip on the probe. By providing relative scanning movement between the tip and the sample, surface characteristic data can be acquired over a particular region of the sample, and a corresponding map of the sample can be generated. The use of supported-beam structures according to this disclosure may have additional applications.

Thus, embodiments of the FOLDED BEAM SUSPENSION FOR PROBE are disclosed. The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A probe structure comprising:
a supported-beam structure comprising an inner beam structure completely surrounded by an outer support, the inner beam structure flexibly connected to the outer support, the inner beam structure having a central region and the outer support having outer corner regions, the outer corner regions providing attachment to a supporting mechanism for the probe structure; and
a probe tip located at the central region of the inner beam structure.

2. The probe structure of claim 1, the supported-beam structure comprising at least three arms connected at the central region, each arm having an inner beam structure surrounded by an outer support, the inner beam structure hingedly connected to the outer support at a distal end of each arm.

3. The probe structure of claim 2 comprising four arms connected at the central region.

4. The probe structure of claim 1, wherein a portion of the inner beam structure and a portion of the outer support extend parallel to each other.

5. The probe structure of claim 1 comprising a second supported-beam structure the same as the supported-beam structure, the second supported-beam structure fixedly spaced from the supported-beam structure.

6. The probe structure of claim 1 in combination with a storage medium, wherein when in a first position, the probe tip is in operational contact with the storage medium.

7. The probe structure of claim 6, wherein the probe tip is within 1 nm of the storage medium.

8. The probe structure of claim 1 comprising a gap extending between the inner beam structure and the outer support.

9. The probe structure of claim 1 configured for use in a microscope.

10. A probe structure comprising:
a supported-beam structure comprising an inner beam structure completely surrounded by an outer support, the inner beam structure hingedly connected to the outer support, the inner beam structure having a central region and the outer support having outer corner regions; and a probe tip located at the central region of the inner beam structure, the probe structure attached to a supporting mechanism at a region of the outer support closest to the probe tip.

11. The probe structure of claim 10 comprising at least three arms connected at the central region, each arm having an inner beam structure surrounded by an outer support, the inner beam structure hingedly connected to the outer support at a distal end of each arm.

12. The probe structure of claim 11 comprising four arms connected at the central region.

13. The probe structure of claim 10, wherein a portion of the inner beam structure and a portion of the outer support extend parallel to each other.

14. The probe structure of claim 10 in combination with a storage medium, wherein when in a first position, the probe tip is in operational contact with the storage medium.

15. The probe structure of claim 14, wherein the probe tip is within 1 nm of the storage medium.

16. The probe structure of claim 10 configured for use in a microscope.

17. A probe structure comprising probe tip and probe body, the probe body comprising a cross-beam structure having an inner cross-beam structure completely surrounded by an outer support, the inner cross-beam structure fixed to the outer support at each end of the inner cross-beam structure, with the probe tip located at an intersection region of the inner cross-beam structure; the intersection region movable relative to at least a portion of the outer structure by being deflectable between a first position and a second position, the first position placing the probe tip in operational contact with an electronic storage medium sample, and the second position spacing the probe tip away from the sample.

18. The probe structure of claim 17, wherein operational contact is within 1 nm of the sample.

19. A probe structure comprising:
   a first supported-beam structure comprising a first inner beam structure surrounded by a first outer support, the first inner beam structure hingedly connected to the first outer support, the first inner beam structure having a first central region and the first outer support having first outer corner regions; and a probe tip located at the first central region of the first inner beam structure; and
   a second supported-beam structure the same as the first supported-beam structure, the second supported-beam structure fixedly spaced from the first supported-beam structure, the probe structure attached to a supporting mechanism at a region of the first outer support closest to the probe tip.

* * * * *